United States Patent [19]

Lee et al.

[11] Patent Number: 6,134,376

[45] Date of Patent: *Oct. 17, 2000

[54] COMPUTER SYSTEM HAVING VIDEO CASSETTE RECORDER INCORPORATED THEREIN

[75] Inventors: Cheon-Yeol Lee, Seoul; Chang-Ho Lee, Kyunggi-do, both of Rep. of Korea

[73] Assignee: SamSung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/910,049

[22] Filed: Aug. 12, 1997

[30] Foreign Application Priority Data

Aug. 12, 1996 [KR] Rep. of Korea ...................... 96-33438

[51] Int. Cl.[7] ........................................................ H04N 5/91
[52] U.S. Cl. ............................ 386/46; 386/113; 386/118; 361/685; 361/727; 358/906; 348/552; 348/836
[58] Field of Search ............................. 386/46, 117–118, 386/113; 348/552, 836–838, 461, 563; 358/906, 909.1; 360/71; 361/685, 727; H04N 8/91

[56] References Cited

U.S. PATENT DOCUMENTS

| | | |
|---|---|---|
| 4,578,718 | 3/1986 | Parker et al. . |
| 4,689,022 | 8/1987 | Peers et al. . |
| 4,730,222 | 3/1988 | Schauffele ............................... 358/310 |
| 4,839,745 | 6/1989 | Tindall .................................... 358/336 |
| 4,873,584 | 10/1989 | Hashimoto . |
| 4,959,979 | 10/1990 | Filipow et al. ............................. 70/58 |
| 4,985,783 | 1/1991 | Falck . |
| 5,105,317 | 4/1992 | Sugiyama et al. ......................... 360/71 |
| 5,142,447 | 8/1992 | Cooke et al. ............................ 361/394 |
| 5,239,427 | 8/1993 | Ooka et al. ................................ 360/71 |
| 5,392,192 | 2/1995 | Dunn et al. ............................. 361/683 |
| 5,450,359 | 9/1995 | Sharma et al. . |
| 5,475,835 | 12/1995 | Hickey . |
| 5,499,115 | 3/1996 | Kojima et al. ........................... 348/836 |
| 5,548,480 | 8/1996 | Rudi et al. .............................. 361/685 |
| 5,576,844 | 11/1996 | Anderson et al. . |
| 5,583,582 | 12/1996 | Higuchi et al. .......................... 348/836 |
| 5,633,843 | 5/1997 | Gupta et al. . |
| 5,650,831 | 7/1997 | Farwell . |
| 5,654,873 | 8/1997 | Smithson et al. ....................... 361/685 |
| 5,822,184 | 10/1998 | Rabinovitz ............................. 361/685 |
| 5,917,467 | 6/1999 | Yoshimura ............................. 345/112 |
| 5,925,129 | 7/1999 | Combs et al. ........................... 713/300 |

*Primary Examiner*—Wendy Garber
*Assistant Examiner*—Vincent F. Boccio
*Attorney, Agent, or Firm*—Robert E. Bushnell, Esq.

[57] ABSTRACT

A computer system is provided having an internal video cassette recorder incorporated therein in order to provide an effective means of recording/playing a moving picture produced in the computer system onto or from a video cassette usable for camcorders. The computer system include a video cassette recorder having a dimension of a conventional drive to be mounted on the computer case with front panel access, and a VCR control circuit for driving a cassette deck mechanism, as well as reproducing video signals recorded in a video cassette or recording the video signals fed from the computer onto the video cassette; and an interface board installed to connect the cassette recorder VCR with the system bus of the computer and to supply a command signal fed from the computer with the VCR control circuit and to transfer a status signal generated in the VCR circuit to the computer for controlling operation of the VCR.

15 Claims, 5 Drawing Sheets

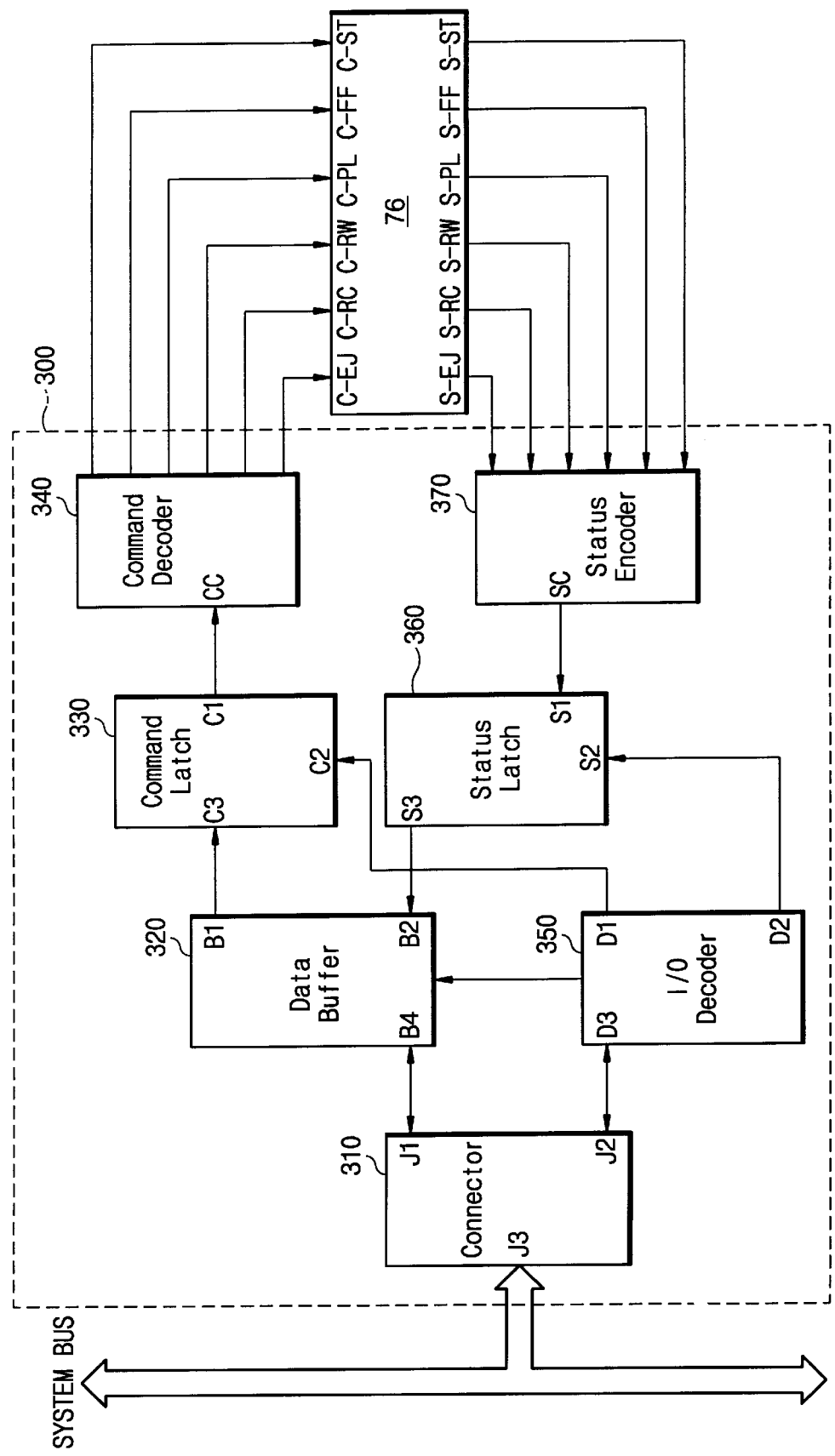

COMPUTER SYSTEM HAVING VIDEO CASSETTE RECORDER INCORPORATED THEREIN

CLAIM FOR PRIORITY

This application makes reference to, incorporates the same herein, and claims all benefits accruing under 35 U.S.C. §119 from an application for COMPUTER SYSTEM WITH VIDEO CASSETTE RECORDER THEREIN earlier filed in the Korean Industrial Property Office on the 12$^{th}$ of August 1996, and there duly assigned Ser. No. 33438/1996, a copy of which application is annexed hereto.

BACKGROUND OF THE INVENTION

1. Technical Field

The present invention relates to a multimedia computer system, and more particularly, relates to a computer system having a drive type video cassette recorder incorporated therein for recording and playing moving images to and from a video cassette tape usable for commercially available camcorders.

2. Related Art

As the performance and scale of microprocessors progress, personal computer systems have drastically moved to multimedia environments for processing a variety of information data, such as text, sounds, graphics, animation, movie, and so forth. Such computer systems are known as multimedia computers. In order to perform a multimedia function, high performance video card, sound card, TV/radio card, modems, etc. must be installed in the computers. In addition, media players such as CD-ROM drives as well as corresponding software drivers must be implemented.

In conventional multimedia computers, a moving picture has been obtained by an MPEG card, a video CD software decoder, or a TV card. A single frame image or successive frames of the moving picture can be captured and stored in a data storage, such as hard disks or floppy disks. Stored image data can subsequently be retrieved for editing purposes as desired by using a graphic software. Usually, when storing, digital data of the moving picture is compressed with a specific data format in accordance with Motion Picture Experts Group (MPEG) standards in order to reduce the size for storage. However, if extended recording for a large number of frames is necessary, the recording time is limited due to the limited capacity of the data storage.

Meanwhile, the moving picture is often produced by camcorders. The picture signal is recorded on a small sized video tape, for example, an 8 mm video cassette tape. When this moving picture is reproduced, usually the camcorder is coupled with a television set, by using a cable connecting the LINE OUT terminal of the camcorder with the LINE IN terminal of the television. Alternatively, the moving picture recorded on the 8 mm video cassette can be directly reproduced through the monitor installed in the camcorder or by using a separate video cassette recorder (VCR) which can receive the 8 mm video cassette. Editing of the moving picture may then be performed under control of the video cassette recorder. Therefore, a need arises that the moving picture recorded in the video cassette tape of the camcorder be reproduced in the multimedia computer systems. In addition, it is also desirable that the moving picture produced in the TV card of the computer system be recorded onto the video cassette tape.

Contemporary VCR control devices for computer systems such as those disclosed in U.S. Pat. No. 4,578,718 for *Control Arrangement And Method For Video Tape Recorder* issued to Parker et al., U.S. Pat. No. 4,689,022 for *System For Control Of A Video Storage Means By A Programmed Processor* issued to Peers et al., U.S. Pat. No. 4,873,584 for *Computer Control For VCR Including Display Of Record Playback Listing And Playback Order Selection* issued to Hashimoto, U.S. Pat. No. 4,985,783 for *Piloting Interface For 8 MM Video Cameras And VTR's And Accessories, By Computer* issued to Falck, U.S. Pat. No. 5,450,359 for *Analog Video Interactive (AVI) PC Add-On Card For Controlling Consumer Grade VHS-VCR* issued to Sharma et al., and U.S. Pat. No. 5,475,835 for *Audio-Visual Inventory And Play-Back Control System* issued to Hickley, are interface devices that can be independent and external from the computer systems or inserted into expansion slots of the computer systems for interfacing with conventional VCRs in order to control their operations through the computer systems. These interface devices essentially serve as connectors between computer systems and conventional VCRs. While contemporary VCR control devices permit convenient control of VCRs through computer systems, it has been our observation that independent VCRs and interfaces devices can be cumbersome, cost prohibitive, and that none is efficiently adapted for portable housing computer systems.

SUMMARY OF THE INVENTION

Accordingly, it is therefore an object of the present invention to provide a personal computer system having a simplified video cassette recorder (VCR) incorporated therein.

It is also an object to provide a computer system having a bay drive for accommodating therein an internal video cassette recorder (VCR).

It is another object to provide a computer system having an internal video cassette recorder (VCR) for recording moving images onto and playing moving images reproduced from a video cassette tape of 8 mm usable for portable camcorders.

These and other objects of the present invention can be achieved by a computer system with an internal video cassette recorder (VCR) having a dimension of a conventional drive inserted into a computer case with a front panel access, and having at front side of the VCR a cassette insertion door, a plurality of function keys, and a video control circuit for driving a cassette deck mechanism as well as reproducing video signals recorded in a video cassette or recording the video input signal fed from the computer onto the video cassette. The computer system also includes means for generating video signals for a moving picture and an application program that is capable of generating command signals for operating the video cassette recorder; and an interface board installed to connect the cassette recorder VCR with the system bus of the computer system and to supply a command signal fed from the computer system with the VCR control circuit and to transfer a status signal generated in the VCR circuit to the computer system.

Video cassette recorder uses 8 mm video cassette that is usable in commercially available camcorders. Preferably, the video signal generating means include a video adapter, a video overlay board, and a TV card, wherein video line in/out terminals of the VCR control circuit are connected with the video overlay board. The interface board comprises a data buffer for storing input/output data between the system bus and the VCR circuit, an I/O decoder for decoding address and control signals fed from the system bus and supplying selection/control signals with the data buffer, a command latch, and a status latch, wherein outputs of the command latch are connected with the function key inputs of the VCR circuit and inputs of the status latch are connected with the status signal outputs of the VCR circuit. According to the present invention, the interface scheme provides for an integrated control system between the computer system and the internal video cassette recorder so that, the recording or playing of the moving picture produced in the computer system to and from the video cassette recorder is possible by selecting a menu of a related application program installed in the computer system.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 6 is a block diagram of an implementation of an interface circuit 300 as shown in FIG. 5.

DETAILED DESCRIPTION OF THE PREFERRED EMBODIMENT

Figure 1:
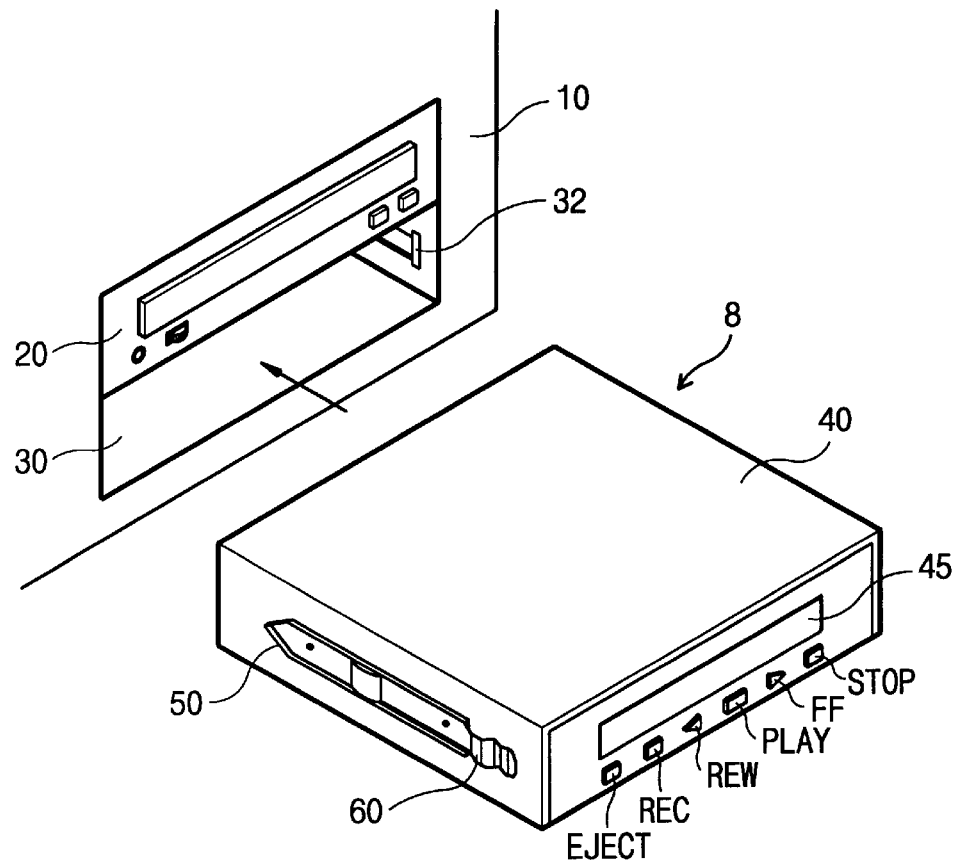
FIG. 1 illustrates a preferred embodiment of an internal video cassette recorder (VCR) of a front loading type adapted for incorporation in a computer system.

Referring now to the drawings and particularly to FIG. 1, which illustrates one embodiment of a video cassette recorder (VCR) of a front loading type to be used with a computer system. Preferably, the VCR 8 has a dimension of the conventional full-height 5.25-inch disk drive with a front panel access. The computer system has a unitary case structure 10 comprising a main board supporting a processor, auxiliary memory devices such as a typical CD-ROM drive 20, and a drive bay 30 for accommodating therein an insertion of a VCR 8 in a simplified, portable housing structure 40. At left and right sides of the VCR housing 40, for example, sleds 50 are mounted to be slid into a drive bay 30 of the computer case 10. At a front end of each sled 50, an elastic leaf spring 60 is formed to fix the VCR 8 to the drive bay 30 of the computer case 10, when the VCR 8 is inserted into the bay drive via guide rails 32. Thus, the VCR 8 can be mounted at the front panel of the computer case 10 like a CD-ROM drive 20 mounted at the upper side bay of the computer case 10. Further, at front side of the VCR housing 40 there are provided a cassette insertion door 45 for accommodating an insertion of a video cassette and a plurality of function keys EJECT, REC, REW, PLAY, FF, and STOP. Preferably, the video cassette for use in the VCR 8 is commercially available, such as 8 mm video cassettes usable in commercially available camcorders.

Figure 2:
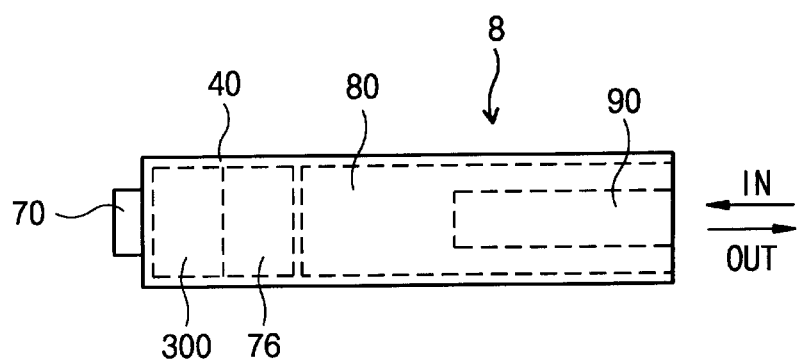
FIG. 2 is a schematic sectional view of the front loading type VCR as shown in FIG. 1.

The inside of the front loading type VCR 8 is schematically shown in FIG. 2. For the sake of simplicity, the section is divided by dashed lines into many compartments for receiving functional units or blocks, and the detail of the blocks are omitted herein. A cassette deck of front loading type may be located within block 80 together with a deck mechanism associated therein. The cassette deck 80 and its deck mechanism are configured to receive and drive an 8 mm video cassette 90. Thus, the video cassette 90 can be inserted into the cassette deck 80 through the cassette insertion door 45, and ejected from the cassette deck 80 by pressing the eject button provided on the front panel of the VCR housing 40, in the same way such as a conventional front loading type VCR. Further, a VCR control circuit is provided at block 76. At the rear side of the VCR housing 40, a connector plug 70 is provided for connecting the VCR through an IDE cable with the computer main board. Also, provided at block 300 between the connector plug 70 and the VCR control circuit 76 is an interface board constructed according to the principles of the present invention, which will be described in detail later hereinbelow.

Figure 3:
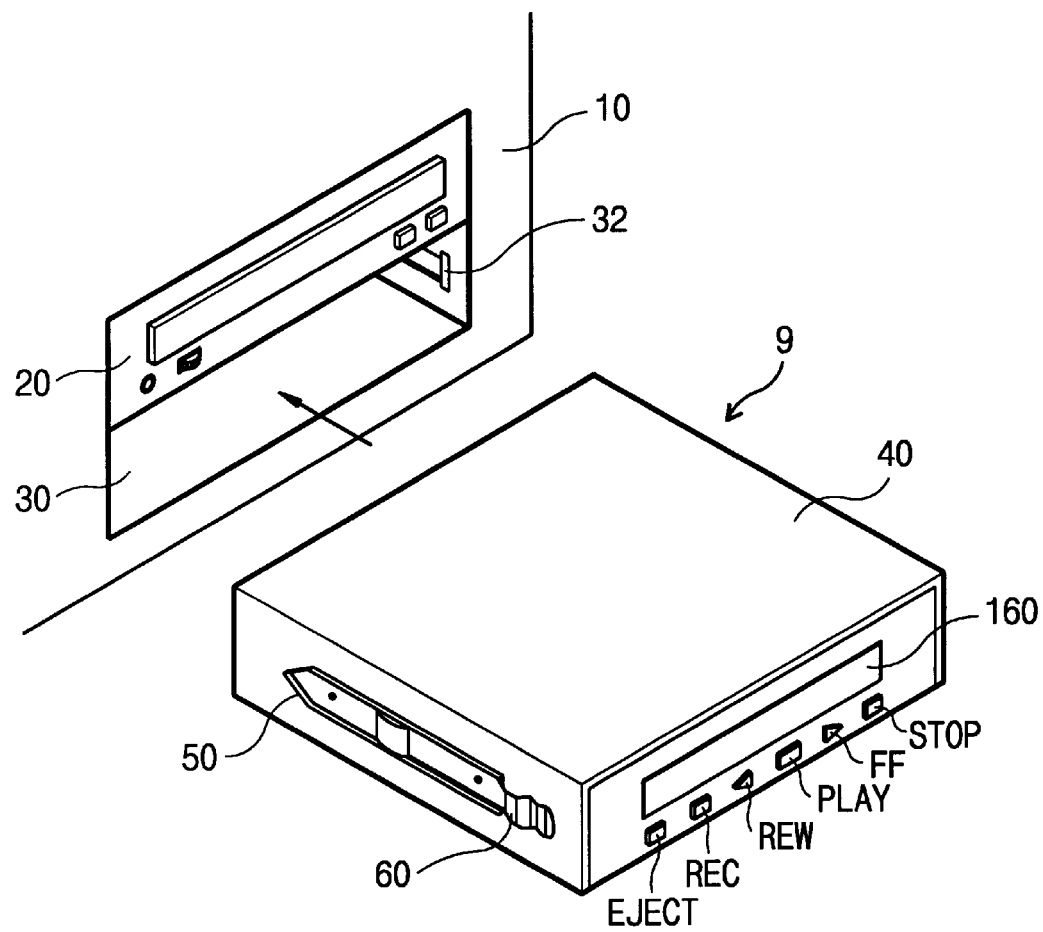
FIG. 3 illustrates another embodiment of an internal video cassette recorder (VCR) of a camcorder deck type adapted for incorporation in a computer system.

Refer now to FIG. 3, which illustrates another embodiment of a VCR of a camcorder deck type to be used with the computer system. Similar to the VCR shown in FIG. 1, the VCR 9 is manufactured in the form of the full-height 5.25-inch disk drive with a front panel access. Also, at left and right sides of the VCR housing 40, for example, sleds 50 are mounted to be slid into a drive bay 30 of the computer case 10. At front end of each sled 50, an elastic leaf spring 60 is formed to fix the VCR 8 to the bay 30 of the computer case 10, when the VCR 8 is inserted into the bay drive via guide rails 32. Thus, the VCR 9 can be mounted at the front panel of the computer case 10. Reference numeral 20 denotes, for example, a CD-ROM drive mounted at the upper bay of the computer case 10. Further, at front panel of the VCR housing 40 there are provided a cassette reception tray 160 and a plurality of function keys EJECT, REC, REW, PLAY, FF, and STOP. The video cassette for use with the VCR 9 is commercially available, such as 8 mm video cassettes used in commercially available camcorders.

Figure 4A:
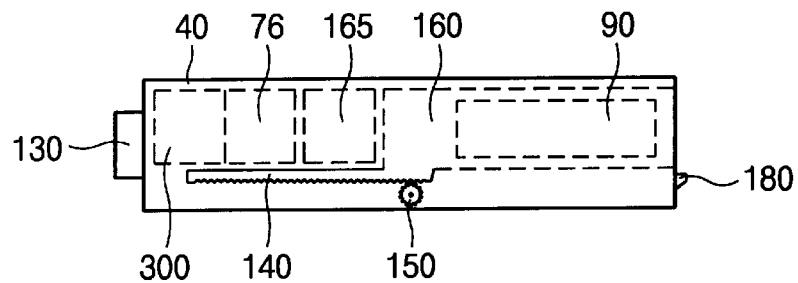
FIG. 4A is a schematic sectional view of the camcorder deck type VCR as shown in FIG. 3.

The inside of the camcorder deck type VCR 9 is schematically shown in FIG. 4A. For the sake of simplicity, shown are the compartments for receiving functional units or blocks indicated by the dashed lines as well as a tray driving mechanism. Located in block 160 is the cassette deck comprising a cassette reception tray and a rack 140 mounted at lower side of the tray. Reference numeral 90 denotes the 8 mm video cassette. The rack 140 is engaged with a pinion 150 rotatably mounted in the deck mechanism 165 and driven by a motor (not shown). A VCR control circuit is provided at block 76 for controlling operation of the VCR 9. Also, at the rear side of the VCR housing 40, a connector plug 130 is provided for connecting the VCR 9 through an IDE cable with the computer main board. Block 300 located between the connector plug 130 and the VCR control circuit 76 represents an interface board constructed according to the principles of the present invention which will be described later hereinbelow.

Figure 4B:
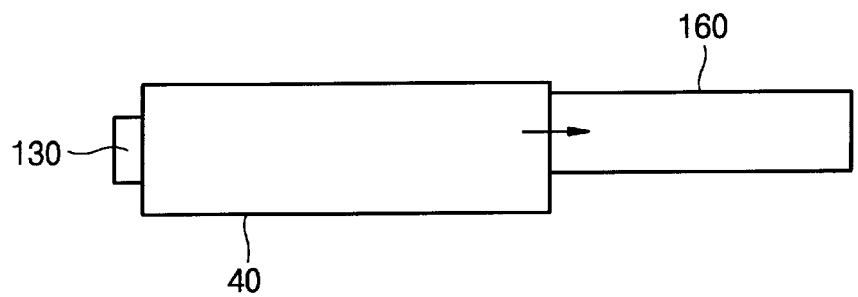
FIG. 4B and 4C are a side view of the camcorder deck type VCR as shown in FIG. 3 for illustrating tape loading and unloading operations, respectively.
Figure 4C:
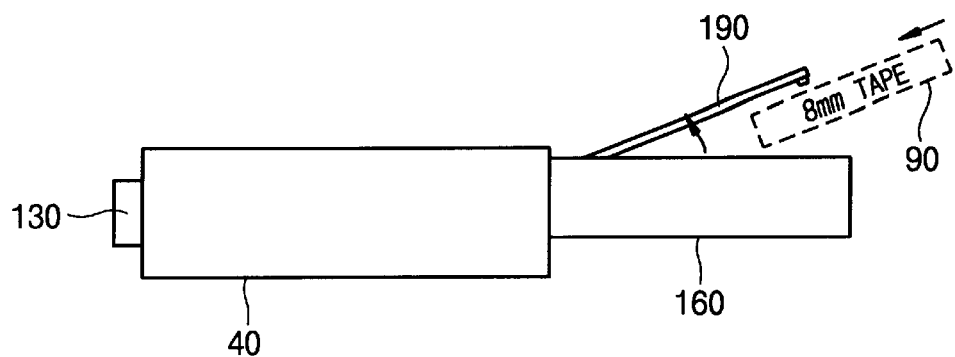

FIGS. 4B and 4C illustrate tape loading and unloading operations of the cassette deck 160 of the camcorder deck type VCR 9. When the open/close button 180 is pressed, the tray of the cassette deck 160 is drawn outwardly by the linear movement of the rack 140 in the deck mechanism 165.

This draw out operation is performed by the motor driving controlled by the VCR control circuit 76. When the tray of the cassette deck 160 is fully drawn outwardly, a lid 190 is lifted to receive the video cassette 90 through an opening formed thereon. Preferably, at a bottom of the lid 190, a conventional guide is provided to receive the video cassette 90 and to align the video cassette 90 with the cassette deck 160. By pressing the open/close button 180 again or pushing the cassette tray 160, the cassette tray 160 is retracted to its original position in the VCR housing 40. Then the playing the video cassette or the recording operation, for example, become possible by pressing corresponding function keys.

Figure 5:
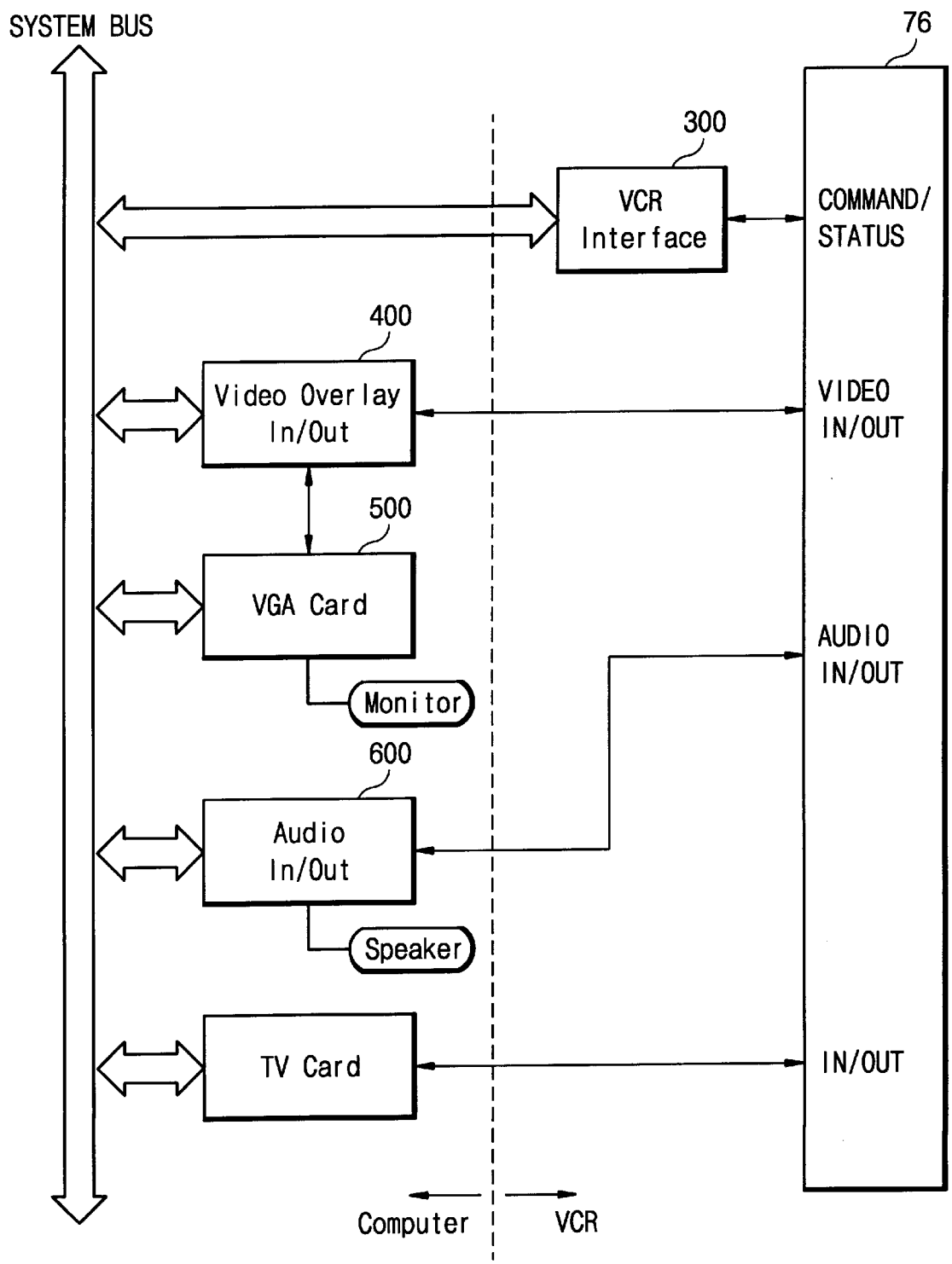
FIG. 5 is a block diagram of an interface scheme between an internal VCR and a computer system according to the principles of the present invention.

FIG. 5 illustrates an interface scheme between the internal VCR and the computer system according to the principles of the present invention. The VCR control circuit 76 of either the front loading type VCR 8 or the camcorder deck type VCR 9 is connected with the computer system through an interface board 300. Basically, the interface board 300 has input/output terminals connected to the command input terminals and status output terminals of the VCR control circuit 76 in order to supply a command signal fed from the computer system with the VCR control circuit 76 and to transfer a status signal generated in the VCR circuit 76 to the computer system. Also, the interface board 300 is connected with the system main bus via connector plug 70 through an IDE cable.

The video line in/out terminals of the VCR control circuit 76 are connected with a video overlay board 400 installed in the computer system. The computer system also includes a video card 500 and a TV card all of which are connected with the system main bus. The video overlay board 400 and the video card 500 are connected by signal lines so that an image data, clock signal, and video synchronization signal are supplied from the video card 500 to the video overlay board 400. Preferably, the video overlay board 400 includes a video signal input/output port, a codec, an analog-to-digital converter with sampling logic, and a video RAM.

In the video overlay board 400, the analog video input signal fed from the VCR circuit 76 is converted into a corresponding digital video signal to be mixed with the video signal generated from the video card 500. At this time, the video card 500 supplies the image data, clock signal, and video synchronization signal with the video overlay board 400. This mixed video signal is then returned to the video card 500 for a visual display on a display monitor. Further, the encoder of the video overlay board 400 converts the display data generated from the video card 500 into an analog video signal format, for example NTSC or PAL television signals. This analog output signal is supplied with the video line-in terminal of the VCR circuit 76 to be recorded onto the video cassette tape.

Further, a sound card 600 installed in the computer system may receive the audio output signal of the VCR circuit 76. Also, the video overlay board 400 may be incorporated into the video card 500 for simplicity.

FIG. 6 illustrates a detailed block diagram of the interface board 300 as shown in FIG. 5. The interface board 300 comprises a data buffer 320, an I/O decoder 350, a command latch 330, and a status latch 360. In addition, the interface board 300 may include a connector 310 to receive an IDE cable connected with the system bus. Also, the command latch 330 has a decoder 340 connected to each function key input of the VCR control circuit 76, and the status latch 360 has an encoder 370 connected to each status output, for example the conventional display output for LCD or VFD display of the VCR.

As shown in FIG. 6, the data buffer 320 is provided for storing input/output data between the system bus and the VCR circuit 76, and the I/O decoder 350 for decoding address and control signals fed from the system bus and supplying selection/control signals with the data buffer 320, the command latch 330, and the status latch 360. Thus, a command signal for operating the VCR such as a play command signal, can be supplied with the corresponding key input terminal C-PL of the VCR circuit 76 through the interface circuit 300. This command signal may be generated in a VCR control program stored in the computer system instead of direct pressing of the function key provided in the front panel of either the front loading type VCR 8 or the camcorder deck type VCR 9. With this, the VCR control circuit 76 permits the front loading type VCR 8 or the camcorder deck type VCR 9 to play the video cassette and to reproduce the video signal recorded in the cassette tape 90. Then, the reproduced video signal is supplied with the video signal input port of the video overlay board 400 installed in the computer system as shown in FIG. 5. The analog video input signal fed from the VCR circuit 76 is converted into the corresponding digital video signal and mixed with the video signal generated in the video card 500. This mixed video signal is then returned to the video card 500 for a visual display on a display monitor.

In a recording operation, when the record command signal is generated during playing of a moving picture in the computer system, it is supplied with the corresponding key input terminal C-RC of the VCR circuit 76 through the interface board 300. This command signal enables the VCR to enter into the recording operation. At this time, the video signal of the moving picture is supplied from the output of the video overlay board 400 provided in the computer system as shown in FIG. 5. Also, the supplied video signal has been converted into the necessary analog video signal format by the encoder of the video overlay board 400. This analog video signal is input at the video line-in terminal of the VCR circuit 76 to be recorded onto the video cassette tape.

As apparent from foregoing descriptions, the interface scheme according to the principles of the present invention advantageously provides for an integrated control system between the computer system and the internal video cassette recorder. Thus, the recording or playing the moving picture produced in the computer system on or from the video cassette recorder is possible by selecting a menu of a related application program in the computer system. Further, this invention relieves the time limitation for storing the moving picture produced in the computer system, as well as simplifies the playing/editing of the moving picture recorded in the 8 mm video cassette used in the camcorder, which results in multimedia function enhancements of computer systems.

While there have been illustrated and described what are considered to be preferred it embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system, comprising:

a computer case including a main board supporting a processor for controlling operation of a video cassette recorder, a system bus, and a drive bay positioned at a front panel of said computer case for accommodating said video cassette recorder; and said video cassette recorder having a portable housing structure for selective insertion into and selective removal from said drive bay of said computer case, said video cassette recorder including a cassette deck mechanism for loading and unloading a video cassette, a video control circuit to drive the cassette deck mechanism, and an interface board to connect said video cassette recorder with the system bus for exchanging communications between the processor and the video control circuit to control operation of said video cassette recorder, said video cassette recorder having a plurality of function keys including an eject key, a record key, a rewind key, a play key, a fast-forward key and a stop key installed on a front side of said portable housing structure of said video cassette recorder to enable a user to manually control operation of said video cassette recorder, and said video cassette recorder corresponding to a front loading type video cassette recorder having a cassette insertion door for accommodating insertion of a video cassette in response to operation of the eject key installed on the front side of the portable housing structure of said video cassette recorder.

2. The computer system of claim 1, further comprised of said video cassette recorder using 8 mm video cassettes usable in camcorders.

3. A computer system, comprising:

a computer case including a main board supporting a processor for controlling operation of a video cassette recorder, a system bus, and a drive bay positioned at a front panel of said computer case for accommodating said video cassette recorder; and said video cassette recorder having a portable housing structure for selective insertion into and selective removal from said drive bay of said computer case, said video cassette recorder including a cassette deck mechanism for loading and unloading a video cassette, a video control circuit to drive the cassette deck mechanism, and an interface board to connect said video cassette recorder with the system bus for exchanging communications between the processor and the video control circuit to control operation of said video cassette recorder, said video cassette recorder having a plurality of function keys including an eject key, a record key, a rewind key, a play key, a fast-forward key and a stop key installed on a front side of said portable housing structure of said video cassette recorder to enable a user to manually control operation of said video cassette recorder, and said video cassette recorder corresponding to a camcorder deck type video cassette recorder having a cassette deck for sliding forward to an open position to receive loading of a video cassette and for sliding backward to a closed position to perform one of a recording operation and a playback operation.

4. A computer system, comprising:

a computer case including a main board supporting a processor for controlling operation of a video cassette recorder, a system bus, and a drive bay positioned at a front panel of said computer case for accommodating said video cassette recorder, said computer case including a plurality of guide rails; and said video cassette recorder having a portable housing structure for selective insertion into and selective removal from said drive bay of said computer case, and said portable housing structure of said video cassette recorder including a plurality of sleds, each sled having an elastic leaf spring and being positioned on a corresponding side of said portable housing structure permitting insertion of said video cassette recorder into the drive bay of said computer case when each said sled is respectively positioned in a corresponding guide rail of the plurality of guide rails of the computer case, said video cassette recorder including a cassette deck mechanism for loading and unloading a video cassette, a video control circuit to drive the cassette deck mechanism, and an interface board to connect said video cassette recorder with the system bus for exchanging communications between the processor and the video control circuit to control operation of said video cassette recorder.

5. A computer system, comprising:

a computer case including a main board supporting a processor for controlling operation of a video cassette recorder, a system bus, and a drive bay positioned at a front panel of said computer case for accommodating said video cassette recorder; and said video cassette recorder having a portable housing structure for selective insertion into and selective removal from said drive bay of said computer case, said video cassette recorder including a cassette deck mechanism for loading and unloading a video cassette, a video control circuit to drive the cassette deck mechanism, and an interface board to connect said video cassette recorder with the system bus for exchanging communications between the processor and the video control circuit to control operation of said video cassette recorder, said video cassette recorder having a plurality of function keys including an eject key, a record key, a rewind key, a play key, a fast-forward key and a stop key installed on a front side of said portable housing structure of said video cassette recorder to enable a user to manually control operation of said video cassette recorder, and said video cassette recorder corresponding to a camcorder deck type video cassette recorder having a cassette deck for sliding forward to an open position to receive loading of a video cassette and for sliding backward to a closed position to perform one of a recording operation and a playback operation, the camcorder deck type video cassette recorder including a lid openable for loading of a video cassette when the cassette deck slides forward to the open position to receive the loading of said video cassette.

6. A computer system having an internal video cassette recorder, comprising:

a computer case including a main board supporting a processor for controlling operation of an internal video cassette recorder, a system bus, and a drive bay positioned at a front panel of said computer case for accommodating said internal video cassette recorder; and said internal video cassette recorder selectively positioned in said drive bay of said computer case, said internal video cassette recorder including a cassette deck mechanism for loading and unloading a video cassette, a video control circuit to drive the cassette deck mechanism, and an interface board to connect said internal video cassette recorder with the system bus for exchanging communications between the processor and the video control circuit to control operation of said internal video cassette recorder, said internal video cassette recorder including a plurality of function keys installed on a front side of said internal video cassette recorder to enable a user to manually control operation of said internal video cassette recorder, and said internal video cassette recorder including a cassette insertion door located adjacent to the function keys for accommodating an insertion of a video cassette in response to operation of a selected one of said function keys installed on the front side of said internal video cassette recorder.

7. The computer system of claim 6, further comprised of said internal video cassette recorder using 8 mm video cassettes usable in camcorders.

8. The computer system of claim 6, further comprised of said computer case including a video card, a video overlay board and a TV card, and further comprised of video line in/out terminals of the video control circuit of said internal video cassette recorder being respectively connected with a video input/output port of each of the video card, the video overlay board, and the TV card.

9. The computer system of claim 6, further comprised of said interface board of said internal video cassette recorder comprising a data buffer for storing input/output data between the system bus and the video control circuit, an input/output decoder for decoding address and control signals fed from the system bus and supplying selection/control signals with the data buffer, a command latch, and a status latch, wherein an output of the command latch is connected with function key inputs of the video control circuit and an input of the status latch is connected with status signal outputs of the video control circuit.

10. The computer system of claim 6, further comprised of said computer case including a plurality of guide rails, and said internal video cassette recorder including a plurality of sleds, each sled having an elastic leaf spring and being positioned on a corresponding side of said internal video cassette recorder permitting insertion of said internal video cassette recorder into the drive bay of said computer case when each said sled is respectively positioned in a corresponding guide rail of the plurality of guide rails of the computer case.

11. A computer system having an internal video cassette recorder, comprising:
  a computer case including a main board supporting a processor for controlling operation of an internal video cassette recorder, a system bus, and a drive bay positioned at a front panel of said computer case for accommodating said internal video cassette recorder; and
  said internal video cassette recorder selectively positioned in said drive bay of said computer case, said internal video cassette recorder including a cassette deck mechanism for loading and unloading a video cassette, a video control circuit to drive the cassette deck mechanism, and an interface board to connect said internal video cassette recorder with the system bus for exchanging communications between the processor and the video control circuit to control operation of said internal video cassette recorder, said internal video cassette recorder including a plurality of function keys installed on a front side of said internal video cassette recorder to enable a user to manually control operation of said internal video cassette recorder, and said internal video cassette recorder including a cassette deck for sliding forward to an open position to receive loading of a video cassette and for sliding backward to a closed position to perform one of a recording operation and a playback operation in response to operation of a selected one of said function keys installed on the front side of said internal video cassette recorder.

12. The computer system of claim 11, further comprised of said internal video cassette recorder using 8 mm video cassettes usable in camcorders.

13. The computer system of claim 11, further comprised of said interface board of said internal video cassette recorder comprising a data buffer for storing input/output data between the system bus and the video control circuit, an input/output decoder for decoding address and control signals fed from the system bus and supplying selection/control signals with the data buffer, a command latch, and a status latch, wherein an output of the command latch is connected with function key inputs of the video control circuit and an input of the status latch is connected with status signal outputs of the video control circuit.

14. The computer system of claim 11, further comprised of said computer case including a plurality of guide rails, and said internal video cassette recorder including a plurality of sleds, each sled having an elastic leaf spring and being positioned on a corresponding side of said internal video cassette recorder permitting insertion of said internal video cassette recorder into the drive bay of said computer case when each sled is respectively positioned in a corresponding guide rail of the plurality of guide rails of the computer case.

15. The computer system of claim 11, further comprised of said internal video cassette recorder including a lid openable for loading of the video cassette when the cassette deck slides forward to the open position to receive the loading of said video cassette.

* * * * *